Patented Nov. 21, 1933

1,935,733

UNITED STATES PATENT OFFICE 1,935,733

PROCESS FOR THE MANUFACTURE OF SYNTHETIC RUBBER

Eduard Tschunkur, Cologne - Mulheim, and Walter Bock, Cologne-Flittard, Germany, assignors to I. G. Farbenindustrie Aktiengesellschaft, Frankfort-on-the-Main, Germany, a corporation of Germany No Drawing. Application January 12, 1928, Serial No. 246,378, and in Germany January 14, 1927

9 Claims. (Cl. 260—6)

The present invention concerns the manufacture of synthetic rubber and consists in emulsifying appropriate hydrocarbons of the butadiene series characterized by containing in their molecule the chain—C=C—C=C—, such as for example butadiene, isoprene, dimethylbutadiene and the like or analogues thereof, either alone or mixed with one another with aqueous viscous liquids having emulsifying properties such as aqueous solutions of proteins, gelatine, alkali metal oleates the sodium salt of isobutylnaphthalene sulfonic acid etc., and causing polymerization to proceed in these emulsions in the presence of a substance acting as oxidizing agent on the hydrocarbons of the butadiene series at the temperature of polymerization. In particular this polymerization proceeds especially quickly and almost quantitatively, when, in addition to oxygen and agents yielding oxygen, metallic salts are added, such as for example salts of cobalt, lead, manganese, chromium, nickel, silver and the like. The salts of those metals, which exist in several valences are particularly efficacious. There may be employed soluble as well as insoluble salts or salts of inorganic or organic acids which dissolve to colloidal solutions. Furthermore freshly precipitated salts or salts in the state of fine division have been found to give satisfactory results, or alternatively the metallic salts can be produced within the polymerizing mixture, for example by the simultaneous addition of a metallic oxide and of an acid, or by any other desired or preferred method. The metallic salts are brought into intimate contact with the hydrocarbons in the presence of air, oxygen or agents yielding oxygen, whereby the polymerization is more quickly completed on account of the catalytic influence of these additions.

The following examples will illustrate our invention:—

Example 1.—50 kilograms of isoprene and 50 kilograms of dimethylbutadiene are emulsified with 1 kg. of egg albumin and 1 kg. of Marseilles soap in 20 kgs. of water and polymerized hot in the presence of 2 to 3 times the volume of gaseous oxygen.

Example 2.—4 kgs. of sodium perborate are added to 100 kgs. of isoprene and 2 kgs. of alkali oleate in 30 kgs. of water, the whole is emulsified with continued shaking or stirring in the presence of an equal volume of air and then polymerized at about 60 to 70° C.

Example 3.—3 kgs. of potassium percarbonate are added to an emulsion of 80 kgs. of isoprene and 20 kgs. butadiene in a solution of 2 kgs. of the sodium salt of isobutylnaphthalene sulphonic acid in 75 kgs. of water; polymerization is then effected at moderate heat.

The period of polymerization following the directions in the foregoing examples is on the average a few weeks.

Example 4.—100 kgs. of erythrene are shaken at about 60° C. in the presence of relatively large volumes of air with a solution of 4 kgs. of blood albumin in 75 kgs. of water with the addition of 0.75 kg. of the freshly precipitated manganous salt of boric acid. This mixture is completely polymerized in a few days.

Example 5.—60 kgs. of isoprene are cooled with ice, saturated with oxygen and agitated in a shaking machine with a solution of 3 kgs. of gelatine in 50 kgs. of water with the addition of 1 kg. of freshly precipitated cobalt carbonate at about 60° C. The polymerization is completed in a few days.

Example 6.—100 kgs. of isoprene are agitated with a mixture of 3 kgs. gelatine, 2 kgs. of barium peroxyde, 2.6 kgs. of manganic sulphate and 50 kgs. of water at 60° C. The mixture is completely polymerized in a few days.

Example 7.—80 kgs. of erythrene are shaken with a mixture of 3 kgs. of casein, 2 kgs. of tetra hydro naphthalene sulphonic acid, 1 kg. of lead carbonate and 50 kgs. of water in the presence of oxygen at 60° C. The polymerization is completed in a few days.

The relative quantities referred to, the additions and methods for effecting the same, as well as the temperatures of polymerization can be varied within wide limits; it will be readily understood, that the invention is not restricted by the above examples, which are only intended to show how invention can be carried into effect with the best prospects of success at present known to us.

We claim:—

1. In the process for the manufacture of synthetic rubber the step which comprises emulsifying hydrocarbons of the butadiene series suitable for the manufacture of rubber with an aqueous viscous solution of an emulsifying agent and causing polymerization to proceed in these emulsions in the presence of a substance acting as an oxidizing agent on said hydrocarbons at the temperature of polymerization.

2. In the process for the manufacture of synthetic rubber the step which comprises emulsifying hydrocarbons of the butadiene series suitable for the manufacture of rubber with an aqueous viscous solution of an emulsifying agent and causing polymerization to proceed in these emulsions in the presence of oxygen.

3. In the process for the manufacture of synthetic rubber, the step which comprises emulsifying hydrocarbons of the butadiene series suitable for the manufacture of rubber with an aqueous viscous solution of an emulsifying agent and causing polymerization to proceed in these emulsions in the presence of a substance acting as an oxidizing agent on said hydrocarbons at the temperature of polymerization with the addition of a metal salt.

4. In the process for the manufacture of synthetic rubber the step which comprises emulsifying hydrocarbons of the butadiene series suitable for the manufacture of rubber with an aqueous viscous solution of an emulsifying agent and causing polymerization to proceed in these emulsions in the presence of oxygen with the addition of a metal salt.

5. In the process for the manufacture of synthetic rubber the step which comprises emulsifying erythrene with an aqueous viscous solution of an emulsifying agent and causing polymerization to proceed in these emulsions in the presence of a substance acting as an oxidizing agent on said hydrocarbon at the temperature of polymerization.

6. In the process for the manufacture of synthetic rubber the step which comprises emulsifying erythrene with an aqueous viscous solution of an emulsifying agent causing polymerization to proceed in the emulsions in the presence of oxygen.

7. In the manufacture of synthetic rubber the step which comprises emulsifying erythrene with an aqueous solution of blood albumin and causing polymerization to proceed in this emulsion in the presence of oxygen.

8. In the manufacture of synthetic rubber the step which comprises emulsifying erythrene with an aqueous solution of blood albumin and causing polymerization to proceed in this emulsion in the presence of oxygen with the addition of a metal salt.

9. In the manufacture of synthetic rubber the step which comprises emulsifying erythrene with an aqueous solution of blood albumin and causing polymerization to proceed in this emulsion in the presence of oxygen with the addition of the freshly precipitated manganous salt of boric acid.

EDUARD TSCHUNKUR.
WALTER BOCK.